(12) United States Patent
Sulser et al.

(10) Patent No.: US 8,008,374 B2
(45) Date of Patent: Aug. 30, 2011

(54) PROCESS FOR PRODUCING POLYMERS HAVING AMIDE AND ESTER GROUPS IN THE SOLID STATE

(75) Inventors: Ueli Sulser, Unterengstringen (CH); Anna Krapf, Uitikon Waldegg (CH); Ulf Velten, Oberengstringen (CH)

(73) Assignee: Sika Technology AG, Baar (CH)

( * ) Notice: Subject to any disclaimer, the term of this patent is extended or adjusted under 35 U.S.C. 154(b) by 84 days.

(21) Appl. No.: 12/311,730

(22) PCT Filed: Oct. 26, 2007

(86) PCT No.: PCT/EP2007/061556
§ 371 (c)(1),
(2), (4) Date: Apr. 10, 2009

(87) PCT Pub. No.: WO2008/049924
PCT Pub. Date: May 2, 2008

(65) Prior Publication Data
US 2010/0093895 A1     Apr. 15, 2010

(30) Foreign Application Priority Data
Oct. 26, 2006  (EP) .................................. 06123031

(51) Int. Cl.
*C04B 24/26* (2006.01)
*C08G 69/04* (2006.01)

(52) U.S. Cl. ............................... 524/5; 528/332

(58) Field of Classification Search ....... 524/5; 528/332
See application file for complete search history.

(56) References Cited

U.S. PATENT DOCUMENTS
2006/0004148 A1 *  1/2006  Sulser et al. ............... 525/329.7
2008/0021169 A1 *  1/2008  Sulser et al. ............... 525/327.6

FOREIGN PATENT DOCUMENTS
| | | |
|---|---|---|
| DE | 100 15 135 A1 | 10/2001 |
| EP | 0 739 320 B1 | 12/1999 |
| EP | 0 889 860 B1 | 5/2000 |
| EP | 1 577 327 A1 | 9/2005 |
| EP | 1 632 519 A2 | 3/2006 |
| WO | WO 00/35965 | 6/2000 |

\* cited by examiner

Primary Examiner — Milton I Cano
Assistant Examiner — John Uselding
(74) Attorney, Agent, or Firm — Oliff & Berridge, PC

(57) ABSTRACT

A process for preparing a polymer P having amide and ester groups in the solid state of aggregation, comprising (a) reacting a homo- or copolymer P1 of (meth)acrylic acid, itaconic acid or crotonic acid with at least one monohydroxy compound E at a temperature up to 200° C. to give a polymer P2, so that anhydride groups form in addition to ester groups, (b) cooling the polymer P2 prepared in step (a) being cooled to below 60° C. so that the polymer P2 is present in the solid state of aggregation or as supercooled melt, and (c) amidating the polymer P2 having anhydride groups and present in the solid state of aggregation or as supercooled melt with at least one amine compound A at temperatures below 60° C., the amine compound A used in step (c) being present in the solid state of aggregation or on or in a solid carrier material.

27 Claims, No Drawings

PROCESS FOR PRODUCING POLYMERS HAVING AMIDE AND ESTER GROUPS IN THE SOLID STATE

FIELD OF THE INVENTION

The invention relates to the group of the amides and esters of polymers of α,β-unsaturated carboxylic acids.

PRIOR ART

Polymers of α,β-unsaturated carboxylic acids having polyalkylene glycol side chains have been used for a relatively long time as superplasticizers in concrete technology, owing to their considerable water reduction. These polymers have a comb polymer structure. There is a number of such comb polymers which also have amide groups in addition to ester and carboxyl groups.

Substantially two processes are used for the preparation of these polymers. Polymers are prepared either from the respective monomers having carboxyl, ester and amide functions by free radical polymerization or in a so-called polymer-analogous reaction from a polycarboxyl polymer and the respective alcohols and amines.

The route via free radical polymerization is the most established method but it is complicated in the case of special compounds by the commercial availability of the corresponding monomers and the toxicity thereof and requires complicated process control.

The polymer-analogous reaction has the major advantage that very different comb polymers having very different properties can be obtained from commercially available polymers of α,β-unsaturated carboxylic acids, especially from poly(meth)acrylic acids, by variation of the amount, the type and the ratio of alcohol and amine in a simple and reliable manner. In the polymer-analogous reaction, the safety-critical step of free radical polymerization is absent owing to the use of the commercially available poly(meth)acrylic acids.

Such polymer-analogous reactions are described, for example, in EP 0 889 860 B1, EP 0 739 320 B1 and DE 100 15 135 A1.

The polymer-analogous reaction is effected according to the prior art today in an acid-catalysed reaction of polymers containing carboxyl groups with monofunctional, amine- or hydroxyl-terminated derivatives at temperatures of at least 140° C. to 200° C. These reaction conditions result in various limitations which make a reaction of low-boiling primary or secondary amines impossible or lead to crosslinking in the case of compounds which also have hydroxyl functions in addition to the primary or secondary amine group.

Firstly, it is known to the person skilled in the art that, in a polymer-analogous reaction of polymers containing carboxyl groups, the addition of compounds which have more than one primary or secondary amine group or compounds which also have hydroxyl functions in addition to the primary or secondary amine group inevitably leads to crosslinking of the polymers containing carboxyl groups. However, such crosslinking is not desired since it generally leads to a reduction of the plasticizing effect. In the extreme case, the crosslinking can also lead to the reaction melt crosslinking to such a great extent that it can no longer be discharged from a reactor. The crosslinking cannot be suppressed even by the use of solvents.

Secondly, many primary or secondary amines have a very low boiling point and are classed as an explosion hazard in hazard classification since they can lead to explosions with air in certain ratios and at certain ignition temperatures. All reactions according to a polymer-analogous reaction which are known to date take place either at high temperatures of at least 140° C. and optionally also with the use of a vacuum or passage of an air or nitrogen stream through or over the reaction mixture. These drastic conditions are required in order to separate off the water forming during the condensation reaction and hence to permit a complete reaction. However, these conditions make the reaction of low-boiling primary or secondary amines in a polymer-analogous reaction impossible or substantially more difficult and expensive since the required high temperatures are generally above the ignition temperatures of the amines. Furthermore, the use of a vacuum leads to the in any case low boiling points of low-boiling primary or secondary amines being reduced and said amines being removed from the reaction in an undesirable manner as a result of the vacuum. The use of a gas stream for removing the water of reaction likewise leads to undesired discharge of the amine from the reaction vessel. As a result, an incomplete reaction, greater contamination of the distillate water and an increased pollution of the waste gas filter and waste air are observed.

In order to overcome this problem, EP1577327A1 proposed a two-stage process in which, in a first step, carboxyl-containing polymers are prepared by polymer-analogous reaction and, in a second step, the anhydride groups formed in the first step are reacted with a monoamine compound at temperatures substantially below 100° C. to give the amide. In this process, an amine and a solvent are used in the second step. Polymers in solvents or those which contain a certain proportion of liquid are, however, storage-stable only to a limited extent. It is true that it is possible to remove, in particular to evaporate, the solvent or the liquid in a further step. However, this step is complicated and is successful only to a limited extent since a certain proportion of liquid is still present even after the evaporation or spray-drying, which proportion adversely affects the flowability of the powder and the melting point of the polymer. A further disadvantage in the case of spray-drying is the additional use of stabilizers, which usually have to be added in order to prevent oxidative degradation of the polymer. Stabilizers can also lead to an undesired discoloration of the polymer.

SUMMARY OF THE INVENTION

It is therefore an object of the invention to provide a process in which the disadvantages of the prior art are overcome and it is possible to prepare, in the solid state of aggregation, polymers which can be easily modified, which are storage-stable and flowable over a relatively long time and which still have the desired function even after a relatively long time.

Surprisingly, it was found that this can be achieved by a process according to Claim 1, in which polymers in the solid state of aggregation or in supercooled melt are mixed with solid amine compounds or amine compounds which are present on or in a solid carrier material. It was now surprisingly found that, on mixing solid polymer or supercooled polymer melt with solid amine compounds, the amidation of the anhydride groups of the solid polymer takes place even without addition of solvent or of a liquid to such an extent that modified polymers having a high quality can be prepared. By omitting a solvent or a liquid, the solid polymer can be easily processed to give a powder. The process according to the invention moreover makes it possible to prepare starting polymers in a large amount and, if required, to mix them with certain amine compounds depending on the intended use. Thus, the starting polymers can also conveniently be modified on site and used appropriately. In addition, the use of stabilizers, in particular of antioxidants, can be avoided by the process according to the invention.

The comb polymers prepared by the present process are very suitable as superplasticizers for hydraulically setting compositions. Furthermore, it has been found that, because of the process according to the invention, it is possible to achieve a high side chain density and that the comb polymers thus prepared lead to a smaller delay in the hardening process and to a longer processing time in a use in hydraulically setting compositions. If an attempt is made to reduce the ion density in the customary polymer-analogous process in order to control the properties of the polymer, for example by increasing the proportion of ester groups, steric hindrance occurs from a certain degree of esterification and complicates the further reaction or even makes it impossible. As a result of the consequently increased thermal load, the danger of polyether cleavage of the side chains is also increased, which leads to undesired crosslinking of the polymers.

The invention moreover comprises the use of the polymers prepared by the process according to the invention in hydraulically setting compositions. Further advantageous configurations of the invention are evident from the subclaims.

DESCRIPTION OF THE PREFERRED EMBODIMENTS

The present invention relates to a process for the preparation of a polymer P having amide and ester groups in the solid state of aggregation, comprising the steps (a) reaction of a homo- or copolymer P1 of (meth)acrylic acid, itaconic acid or crotonic acid with at least one monohydroxy compound E at a temperature of up to 200° C. to give a polymer P2 so anhydride groups form in addition to ester groups, (b) cooling of the polymer P2 prepared in step (a) to below 60° C. so that the polymer P2 is present in the solid state of aggregation or as supercooled melt, (c) amidation of the polymer P2 having anhydride groups and present in the solid state of aggregation or as supercooled melt with at least one amine compound A at temperatures below 60° C., the amine compound A used in step (c) being present in the solid state of aggregation or on or in a solid carrier material.

Here and below, "monohydroxy compound" is understood as meaning a substance which has only one free hydroxyl group.

Here and below, "monoamine compound" is understood as meaning ammonia as a gas or as an aqueous solution or a substance which has only one free primary or secondary amino group.

In the context of the invention, "molecular weight" is understood as meaning the weight average molecular weight $M_w$.

In the entire present document "(meth)acrylic acid" is understood as meaning both acrylic acid and methacrylic acid.

In the context of the invention, "solid polymers" or "polymers in the solid state of aggregation" or "amine compounds in the solid state of aggregation" is understood as meaning polymers or amine compounds which are present in the solid state of aggregation at room temperature and are, for example, powders, scales, flakes, pellets or sheets and can be transported and stored without problems in this form. In the context of the present invention, a melt, for example a polymer melt, is not understood as meaning a polymer in the solid state of aggregation.

The homo- or copolymer P1 of (meth)acrylic acid, itaconic acid or crotonic acid can be present here as free acid or as partial salt, the term "salt" comprising hereinbelow not only the classical salts as are obtained by neutralization with a base but also complex chemical compounds between metal ions and the carboxylate or carboxyl group as ligands.

The homo- or copolymer P1 is advantageously a homo- or copolymer of methacrylic acid and/or acrylic acid and/or methacrylic acid salt and/or acrylic acid salt. The homo- or copolymer P1 is preferably obtained from a hompolymerization of (meth)acrylic acid, itaconic or crotonic acid or from a copolymerization of (meth)acrylic acid, itaconic acid or crotonic acid with at least one further monomer which is selected from the group consisting of α,β-unsaturated carboxylic acids, α,β-unsaturated carboxylic acid esters, α,β-unsaturated carboxylates, styrene, ethylene, propylene, vinyl acetate and mixtures thereof. Preferably, the further monomer is selected from the group consisting of methacrylic acid, acrylic acid, crotonic acid, itaconic acid, maleic acid, fumaric acid and salts, esters and mixtures thereof.

A copolymer of acrylic acid and methacrylic acid and salts or partial salts thereof are preferred as copolymer P1. The salts or partial salts are typically obtained here by free radical polymerization.

Polymethacrylic acid or polyacrylic acid, in particular polymethacrylic acid, or the salts or partial salts thereof are preferred as homopolymer P1. The salts or partial salts are typically obtained here by free radical polymerization.

P1 is preferably a homopolymer.

The homo- or copolymer P1 of (meth)acrylic acid, itaconic acid or crotonic acid is obtained by a free radical polymerization by customary processes. It can be effected in a solvent, preferably in water, or in the absence of a solvent. This free radical polymerization is preferably effected in the presence of at least one molecular weight regulator, in particular an inorganic or organic sulphur compound, such as, for example, mercaptans, or a phosphorus compound. The polymerization is advantageously effected under conditions such that the homo- or copolymer P1 formed is composed of 10 to 250, preferably 20 to 100, more preferably 25 to 60, monomer building blocks. Such homo- or copolymers P1 of (meth)acrylic acid are commercially available.

The monohydroxy compound E is preferably a C6- to C20-alkyl alcohol or has the formula (I)

$$\text{HO-}[(\text{EO})_x\text{-}(\text{PO})_y\text{-}(\text{BuO})_z]\text{-R}^1 \qquad (I)$$

Here, the indices x, y, z, independently of one another, each represent the values 0-250 and their sum x+y+z is 3 to 250. Furthermore, in formula (I), EO denotes ethyleneoxy, PO denotes propyleneoxy, BuO denotes butyleneoxy or isobutyleneoxy. The EO, PO and BuO building blocks can be present in any possible sequence. Finally, the substituent $R^1$ denotes an alkyl group having 1-20 carbon atoms or an alkylaryl group having 7-20 carbon atoms.

Monohydroxy compounds E of the formula (I), in particular having a methyl, ethyl, isopropyl or n-butyl group as substituent $R^1$ and with z=0, are preferred. E preferably comprises EO/PO copolymers. Even more preferably, the monohydroxy compound E is a polyethylene glycol endcapped at one end.

Mixtures of a plurality of different compounds of group E are also possible. Thus, for example, polyethylene glycols endcapped at one end and having different molecular weights can be mixed or, for example, mixtures of polyethylene glycols encapped at one end with copolymers of ethylene oxide and propylene oxide which are endcapped at one end or polypropylene glycols endcapped at one end can be used. For example, mixtures of C6- to C20-alkyl alcohols and polyethylene glycols encapped at one end are also possible.

In a preferred embodiment, the monohydroxy compound E is a polyalkylene glycol encapped at one end and having a molecular weight $M_w$ of 300 to 10 000 g/mol, in particular of 500 to 5000 g/mol, preferably of 800 to 3000 g/mol.

In a first step (a) for the process according to the invention, the reaction of the homo- or copolymer P1 with the monohydroxy compound E is effected at a temperature of up to 200° C. to give a polymer P2. The temperature for this reaction is preferably between 140° C. and 200° C. However, the reaction is also possible at temperatures between 150° C. and 175° C. Such a high temperature is necessary in order to obtain efficient esterification.

In a preferred embodiment, this first step (a) is carried out in the presence of an esterification catalyst, in particular an acid. Such an acid is preferably sulphuric acid, p-toluenesulphonic acid, benzenesulphonic acid, methanesulphonic acid, phosphoric acid or phosphorous acid. Sulphuric acid is preferred. The removal of the water from the reaction mixture can be effected under atmospheric pressure but also in vacuo. Furthermore, a gas stream can be passed over or through the reaction mixture. The gas stream used may be air or nitrogen.

In an embodiment, a monoamine compound A' is used in addition to the monohydroxy compound E in the first step (a). This results in the formation of amide groups in addition to the formation of ester and anhydride groups in the first step (a). The monoamine compound A' has a boiling point and flashpoint which is higher than the reaction temperature of the first step (a). Furthermore, the monoamine compound A' must not contain any hydroxyl groups.

Typical examples of such monoamine compounds A' can be represented by the formula (II')

$$R^{2'}NH—R^{3'} \quad (II')$$

Firstly, $R^{2'}$ and $R^{3'}$ together can form a ring which optionally contains oxygen, sulphur or further nitrogen atoms.

Examples of such monoamine compounds A' are 9H-carbazole, indoline or imidazole.

Secondly, $R^{2'}$ and $R^{3'}$, independently of one another, may represent an alkyl group having 8 to 20 carbon atoms, a cycloalkyl group having 5 to 9 carbon atoms, an aralkyl group having 7 to 12 carbon atoms, a compound of the formula (III'), (IV') or (V') or H.

$$—R^{4'}—X(R^{5'})_v \quad (III')$$

(IV')

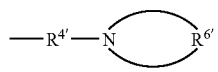

$$-[(EO)_x-(PO)_y-(BuO)_z]-R^1 \quad (V')$$

Here, $R^{4'}$ represents a C1- to C4-alkylene group. $R^{5'}$ represents a $C_1$- to $C_4$-alkyl group. X=S, O or N and v=1 for X=S or O, or v=2 for X=N. $R^{6'}$ represents an alkylene group optionally having heteroatoms and, with the nitrogen atom, forms a 5- to 8-membered ring, in particular a 6-membered ring. The substituent $R^1$ and the indices x, y and z have the meanings as already defined for the compound of the formula (I).

Examples of such monoamine compounds A' are dioctylamine, distearylamine, di-tallow fatty amine, fatty amines such as stearylamine, coconut fatty amine, octadecylamine, tallow fatty amine, oleylamine; 3-butoxy-propylamine, bis(2-methoxyethyl)amine; α-methoxy-ω-aminopolyoxyethylene, α-methoxy-ω-aminopolyoxypropylene, α-methoxy-ω-aminooxyethyleneoxy-propylene copolymer.

The monoamine compound A' is preferably a primary monoamine. Compounds of the formula (II') where $R^{2'}$ is of the formula (V') and $R^{3'}$ is H are particularly preferred as monoamine compounds A'; α-methoxy-ω-amino-oxyethyleneoxypropylene copolymers or α-methoxy-ω-aminopolyoxyethylenes are particularly preferred. Most preferred are α-methoxy-ω-aminopolyoxyethylenes. Such monoamine compounds A' are obtainable, for example, from an alcohol-initiated polymerization of ethylene oxide and/or propylene oxide followed by conversion of the terminal alcohol group into an amine group.

The reaction of the homo- or copolymer P1 with the monohydroxy compound E to give a polymer P2 is typically effected in such a way that the monohydroxy compound E is added to the homo- or copolymer P1 with stirring and is heated to the reaction temperature. The mixture is further stirred at the reaction temperature described above and is reacted possibly in vacuo or by passing a gas stream over or through the reaction mass. If monoamine compound A' is used, the addition thereof can be effected simultaneously with the monohydroxy compound E or at a later time during the first reaction step.

After the reaction, which can be monitored by means of measurement of the acid number, the reaction product is either further processed or stored. The storage can be effected either in heated containers or at room temperature. In the latter case, the reaction product can be reheated prior to further use, preferably up to melting.

In this first step (a), anhydride groups also form in addition to the esters between the homo- or copolymer P1 and the monohydroxy compound E—and optionally in addition to the amides between the homo- or copolymer P1 and the monoamine compound A'. The existence of these anhydride groups can be very easily proved by means of infrared spectroscopy since the anhydride group is known to have a very intense double band in the region of ~1800 cm$^{-1}$ and ~1760 cm$^{-1}$.

Preferably, no amines A' are used in the first step (a).

After the first step (a), other additives can be added, too, in particular mixed with, the polymer P2, preferably before the processing of the polymer melt, in particular before the solidification of the polymer melt to the solid polymer. Such additives may be, for example, alkalis such as, for example, alkali metal or alkaline earth metal hydroxides, other dispersants, such as, for example, sulphonated naphthalene condensates, sulphonated melamine condensates, lignosulphonates, polyacrylates, other polycarboxylates or setting retarders and/or setting accelerators for hydraulically setting binders, viscosity modifiers, surface-active substances, such as surfactants or antifoams, or shrinkage reducers.

In the second step (b) of the process according to the invention, the polymer P2 prepared in step (a) is cooled to below 60° C. so that the polymer P2 is present in the solid state of aggregation or as supercooled melt. Preferably, the polymer P2 is present as powder, flakes, beads, sheets or scales or as supercooled melt after the cooling.

The polymer P2 preparted in the first step (a) can be introduced into vessels in order to solidify there. However, it can also be further processed continuously or in portions by suitable means known to the person skilled in the art for compounding solids which can be handled. For example, the polymer P2 present in step (a), for example as melt, can be cast into sheets and, after solidification in this form, can then be comminuted, for example by chopping, milling or pelleting. The solidification process can be accelerated, for example, by cooling. As a further example of further processing of the polymer melt, the polymer melt can also be directly granulated, for example by means of a cooling bath or a chopper. Alternatively, the cooling can be effected at room temperature by pouring the polymer P2 prepared in step (a) onto a flat substrate and allowing it to solidify, or it can be cooled on an additionally cooled substrate.

In a third step (c), the polymer P2 which is formed in the first step (a) and cooled in the second step (b) and is present in the solid state of aggregation or as supercooled melt and which has anhydride groups in addition to ester groups and optionally amide groups is reacted with an amine compound A at temperatures below 60° C., preferably below 40° C. Preferably, the reaction is effected at between 10° C. and 60° C., particularly preferably between 15 and 40° C., even more preferably between 20 and 30° C. This reaction can be realized under gentle conditions and requires no vacuum, so that amine compounds A having a low boiling point or amine compounds A which also contain hydroxyl groups in addition to the amino group can also be used.

The amine compound A preferably has the formula (II)

$$R^2NH\text{—}R^3 \qquad (II)$$

Firstly, $R^2$ and $R^3$ together can form a ring which optionally contains oxygen, sulphur or further nitrogen atoms.

Examples of such amine compounds A are in particular piperidine, morpholine, pyrrolidine, 1,3-thiazolidine, 2,3-dihydro-1,3-thiazole, imidazole. Morpholine is particularly suitable.

Secondly, $R^2$ and $R^3$, independently of one another, may represent an alkyl group having 1 to 12 carbon atoms, a cycloalkyl group having 5 to 9 carbon atoms, an aralkyl group having 7 to 12 carbon atoms, a hydroxyalkyl group, in particular —CH2CH2—OH or —CH2CH(OH)CH3, a compound of the formula (III), (IV) or (V) or H.

$$—(R^4\text{—}X)_n R^5 \qquad (III)$$

$$(IV)$$

$$-[(EO)_x\text{-}(PO)_y\text{-}(BuO)_z]\text{-}R^1 \qquad (V)$$

Here, $R^4$, independently of one another, represents an alkylene group, preferably a C1- to C4-alkylene group. $R^5$ represents a $C_1$- to $C_4$-alkyl group, a hydroxyalkyl group or H. X, independently of one another, represents an S, O or $NR^7$, n having a value between 1 and 100 and $R^7$, independently of one another, representing a $C_1$- to $C_4$-alkyl group, a hydroxyalkyl group or H. $R^6$ represents an alkylene group, optionally having heteroatoms, and preferably forms a 5-membered to 8-membered ring, in particular a 6-membered ring, with the nitrogen atom. The substituent $R^1$ and the indices x, y and z have the meanings as already defined for the compound of the formula (I).

—$CH_2CH_2$—OH or —$CH_2CH(OH)CH_3$ is preferred as the hydroxyalkyl group.

Suitable amine compounds A are, for example, ammonia, butylamine, hexylamine, octylamine, decylamine, diethylamine, dibutylamine, dihexylamine, cyclopentylamine, cyclohexylamine, cycloheptylamine and cyclooctylamine, dicyclohexylamine; 2-phenylethylamine, benzylamine, xylylamine; N,N-di-methylethylenediamine, N,N-diethylethylenediamine, 3,3'-iminobis(N,N-dimethylpropylamine), N,N-dimethyl-1,3-propanediamine, N,N-diethyl-1,3-propanediamine, N,N,N'-trimethylethylenediamine, 2-methoxyethylamine, 3-methoxypropylamine; ethanolamine, isopropanolamine, 2-aminopropanol, diethanolamine, diisopropanolamine, N-isopropylethanolamine, N-ethylethanolamine, N-butylethanolamine, N-methylethanolamine, 2-(2-aminoethoxy)ethanol; 1-(2-aminoethyl)piperazine, 2-morpholinoethylamine, 3-morpholinopropylamine.

The amine compound A is particularly preferably selected from the group consisting of ammonia, morpholine, 2-morpholin-4-ylethylamine, 2-morpholin-4-ylpropylamine, N,N-dimethylaminopropylamine, ethanolamine, diethanolamine, 2-(2-aminoethoxy)ethanol, dicyclohexylamine, benzylamine, 2-phenylethylamine, polyoxypropylenediamine, such as, for example, Jeffamin® D230, N-(2-hydroxyethyl)ethylenediamine and other amines which are sold, for example, by Huntsman under the name Jeffamine®, and mixtures thereof. Ammonia can be used as a gas or in an aqueous solution.

The amine compound A may also be a monoamine compound A', although this is not preferred.

For the reaction in the third step (c), an amine compound A which is present in the solid state of aggregation, preferably as powder or solid crystals, at the processing temperature of below 60° C., preferably between 10° C. and 60° C., particularly preferably between 15 and 40° C., even more preferably between 20 and 30° C., is used. If the amine compound A is not present in the solid state of aggregation at the processing temperature in the third step (c), for example if it is liquid, the amine compound is applied to a solid carrier material or enclosed in a solid carrier material.

A suitable solid carrier material is, for example, a mineral binder, a hydraulic additive, silicic acid, a molecular sieve, for example zeolites, chalk, stone dust, calcium hydroxide, gypsum, silica, diatomaceous earth, silica fume, rice ash, alumina, aluminium hydroxide, vermiculite, loam, clay, for example expanded clay, or bentonite. Suitable silica is, for example, silica powder, such as, for example, Sipernat®, available from Degussa. The carrier material may be present, for example, in powder form or as fibres. Cement, gypsum, blast furnace sand or silicic acid is particularly preferred as a solid carrier material. Gypsum used may be calcium sulphate dihydrate, calcium sulphate hemihydrate or calcium sulphate anhydrite. The carrier material is preferably basic.

In a preferred embodiment, the third step (c) is effected in such a way that the solid amine A is mixed with the polymer P2 from the second step (b), which is present in solid form, for example as powder or in the form of scales, or as granules or as supercooled melt, with stirring, for example in a mill. If the polymer P2 is present as a supercooled melt after step (b), the polymer P can be prepared in the solid state of aggregation by allowing the polymer P2 combined with the solid amine A to solidify after step (c) and then comminuting it, for example by chopping, milling or pelleting.

The process according to the invention permits the preparation of a polymer P having amide and ester groups in the solid state of aggregation without the additional use of a liquid, in particular of a solvent. Consequently, the step for removing the solvent can be saved, which is time-saving as well as more economical.

In conventional methods, it is possible, if desired, for example to remove the solvent by applying a vacuum and/or heating. In the case of spray-drying, stabilizers, in particular antioxidants, usually also have to be added in order to prevent oxidative degradation of the polymer. In these processes, however, polymers which still have a small proportion of water form. This is disadvantageous in particular for the storage and for the flowability of dry mixtures which contain this polymer. Moreover, the melting point of the polymer is reduced by the proportion of water.

In contrast, neither additional use of a liquid, in particular of a solvent, nor the additional use of stabilizers, in particular of antioxidants, is required for the preparation of a polymer P having amide and ester groups in the solid state of aggregation by the process according to the invention. Thus, polymers P having amide and ester groups and having good flowability are obtained in the solid state of aggregation. Moreover, the polymer P in the solid state of aggregation is not discoloured during the preparation since no stabilizers have to be used.

The polymer P prepared by the process according to the invention therefore preferably has less than 5% by weight, in particular less than 1% by weight, of solvent, in particular water, based on the total weight of the polymer P. Even more preferably, the polymer P is substantially solvent-free, preferably substantially anhydrous. The solvents which are scarcely present or substantially not present at all in the polymer P include, for example, hexane, toluene, xylene, methylcyclohexane, cyclohexane, dioxane, alcohols, such as, for example, ethanol or isopropanol, and water.

intermediate, i.e. the reaction product of the first step, in a simple and cost-efficient manner by using different amine compounds or different amounts of the amine compound A. This has major logistic and financial advantages.

Thus, for example, the polymer P2 in the first two steps can be prepared in the solid state of aggregation in large amounts and stored and can be mixed with the desired amine compound A only on site in order to achieve certain properties of the end product. To enable the solid polymer P2 to react sufficiently with the solid amine compound A so that the end product polymer P has the desired property, a certain time is preferably allowed to elapse after the mixing and before the use of the polymer P, preferably at least 2 hours, even more preferably at least 12 to 24 hours, even more preferably at least 48 hours, preferably 2 to 10 days.

In a preferred embodiment, the polymer P prepared by the process according to the invention and having amide and ester groups substantially has the structure according to formula (VI)

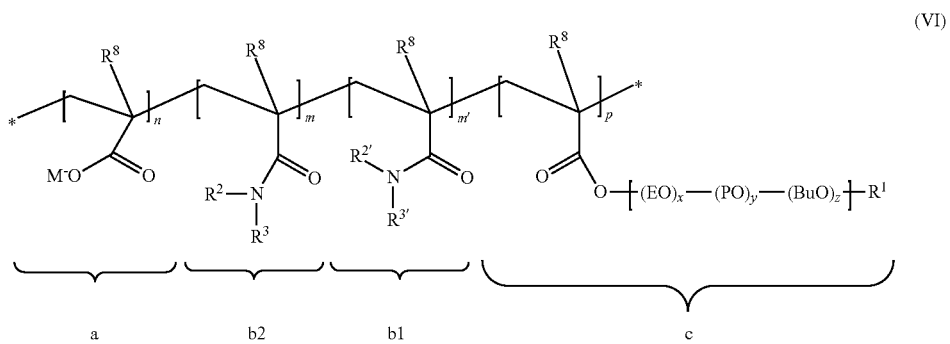

(VI)

In the third step, amine salts can also form in addition to the amide formation. In order to prevent this amine salt formation and to increase the yield of the amidation, alkali metal or alkaline earth metal hydroxides of the amine compound A can preferably be added.

The process according to the invention makes it possible to obtain polymers P having amide and ester groups, which polymers cannot be obtained or can be obtained only in poor quality by the customary polymer-analogous processes, since solvents, in particular water, which adversely affect the ester formation are used for the preparation. Furthermore, this process makes it possible very easily to reduce the content of carboxyl groups—and hence the ion density in the polymer main chain—without increased thermal loading and hence without the danger of polyether cleavage, which would lead to undesired crosslinking of the polymers. If an attempt is made to reduce the ion density in the customary polymer-analogous process, for example by increasing the ester groups, there is steric hindrance from a certain degree of esterification, which steric hindrance complicates the further reaction or even makes it impossible. In contrast, polymer P having amide and ester groups can be prepared in the solid state of aggregation in a high quality by the process according to the invention.

Depending on the amount and type of amine compound A, different properties of the end product can be achieved. It is therefore a further advantage of the process according to the invention that a plurality of different polymers P having amide and ester groups can be prepared starting from an Here, M represents a cation, in particular $H^+$, $Na^+$, $Ca^{++}/2$, $Mg^{++}/2$, $NH_4^+$ or an organic ammonium. It is clear to the person skilled in the art that, in the case of the polyvalent ions, a further counterion which may also be, inter alia, a carboxylate thereof or another molecule of the polymer P must be present. The organic ammonium compounds are in particular tetraalkylammonium or $HR_3N^+$, R representing an alkyl group, in particular a C1- to C6-alkyl group, preferably ethyl or butyl. Organic ammonium ions are obtained in particular by the neutralization of the carboxyl group with commercially available tertiary amines.

The substituents $R^8$, independently of one another, denote a H or methyl. Methyl is preferred as substituent $R^8$.

The substituents $R^2$ and $R^3$ have already been described in the case of the amine compound A of the formula (II). The substituents $R^{2'}$ and $R^{3'}$ have already been described in the case of the monoamine compound A' of the formula (II'). The substituents $R^1$, EO, PO, BuO and the indices x, y and z have already been described for the monohydroxy compound E of the formula (I).

The indices n, m, m' and p denote integers, the sum $n+m+m'+p$ being 10-250, preferably 20-100, in particular 25-80, and n being >0, m>0 and p>0 and m'≧0.

The sequence of the three building blocks a, b1, b2 and c may be blockwise or random, with the exception that, owing to the anhydride mechanism of the amide formation, the building block b2 must be adjacent to or in the vicinity of, in particular adjacent to, a.

The amount of a is 10 to 90 mol %, that of b1 0 to 6 mol %, that of b2 0.1 to 40 mol % and that of c 9.9 to 89.9 mol %, based in each case on the total molar amount of the building blocks of a, b1, b2 and c in the polymer P. The molar amount of b2 must be less than the molar amount of a.

In a preferred embodiment, a polymethacrylic acid is esterified with a polyethylene glycol terminated at one end with a methoxy group and is then reacted in a gentle manner according to the invention with monoethanolamine, which is present absorbed or adsorbed in or on silicic acid. It is clear to the person skilled in the art that the ethanolamine can also react with the silicic acid and can therefore be present bound to the surface thereof.

The polymer P having amide and ester groups is used in various areas, in particular in concrete and cement technology. In particular, the polymer P having amide and ester groups can be used as a superplasticizer for hydraulically setting compositions, in particular concrete and mortar. Here, the polymer P having amide and ester groups can be mixed with a dry blend containing at least one hydraulically setting substance. In principle, all substances known to the person skilled in the art in the area of concrete can be used as the hydraulically setting substance. In particular, these are cements, such as, for example, Portland cements or high-alumina cements and respectively mixtures thereof with fly ash, silica fume, slag, blast furnace sands and limestone filler. Further hydraulically setting substances in the context of the present invention are gypsum, in the form of anhydrite, hemihydrate or dihydrate, or quicklime. A preferred hydraulic setting substance is cement. Furthermore, aggregates, such as sand, gravel, stones, quartz powder, chalks, and constituents customary as additives, such as other concrete superplasticizers, for example lignosulphonates, sulphonated naphthalene-formaldehyde condensates, sulphonated melamine-formaldehyde condensates or polycarboxylate ethers, accelerators, corrosion inhibitors, retardants, shrinkage reducers, antifoams and pore formers, are possible.

The substantially anhydrous, preferably completely anhydrous, polymer P having amide and ester groups in the solid state of aggregation may be a constituent of a hydraulically setting composition, of a so-called dry blend, which is storable over a relatively long time and is typically packed in bags or in silos and is used. Such a dry blend can also be used after a relatively long storage time and has good flowability.

The polymer P having amide and ester groups can also be added to the customary hydraulically setting composition with or shortly before or shortly after the addition of the water. The addition of the polymer P having amide and ester groups in the form of an aqueous solution or dispersion, in particular as mixing water or as part of the mixing water, has proved to be particularly suitable here.

The polymer P having amide and ester groups has a superplasticizer property for hydraulically setting compositions, in particular cementitious compositions, i.e., at water/cement (w/c) ratios customary in cement and concrete technology, the resulting mixture has significantly greater flow behaviour in comparison with a composition without the superplasticizer. The flow behaviour is typically measured via the slump. On the other hand, it is possible to achieve mixtures which, with the same flow behaviour, require significantly less water so that the mechanical properties of the hardened hydraulically setting composition are greatly enhanced. A special use is the use as superplasticizer in ready-mixed mortars. The polymer P having amide and ester groups can also be used as a dispersant for dispersions, in particular for dispersions which contain hydraulic or nonhydraulic binders, in particular for hydraulically setting compositions.

EXAMPLES

1st Step: Esterification and Anhydride Formation 480 g of a 40% strength aqueous solution of a polymethacrylic acid having an average molecular weight of 5000 g/mol are initially introduced into a reaction vessel having a stirrer, thermometer, vacuum connection and distillation apparatus. 5 g of 50% strength sulphuric acid are added with stirring. 300 g of a polyethylene glycol endcapped at one end with a methoxy group and having an average molecular weight of 1100 g/mol and 600 g of a polyethylene glycol endcapped at one end with a methoxy group and having an average molecular weight of 3000 g/mol are added as a melt and the reaction mixture is slowly heated to 170° C. with stirring. Water is continuously distilled off. As soon as the reaction mixture has reached 170° C., stirring is effected for 30 min. at this temperature. Further esterification is then effected in vacuo (80-100 mbar) for 3.5 hours. The direct acid number at the end of the reaction time was determined with 0.67 mmol COOH/g polymer. The molten polymer is poured onto a flat substrate and solidifies into the solid state of aggregation. After cooling and solidification, the solid polymer can easily be detached from the flat substrate and comminuted to give small pieces, in particular scales, which can be packed in tightly sealed containers. Designation: BP1.

2nd Step: Amidation

Example 1

500 g of silicic acid are introduced into a Hobart mixer and 215 g of ethanolamine are added with gentle stirring. The mixture is mixed for a further 5 minutes and then introduced into a glass bottle. The readily flowable powder contains about 30% of ethanolamine. Designation: AT1

550 g of solid polymer BP1 are introduced into a porcelain ball mill and 60 g of AT1 are mixed therewith. This mixture thus contains about 18 g of ethanolamine. This mixture is milled with addition of steel balls for 12 hours. The fine white powder obtained is filled. Designation: EPA1

Example 2

Before solidification, the polymer BP1 is poured onto a flat substrate at about room temperature. AT1 powder is sprinkled onto the supercooled melt at a temperature of less than 60° C., in an amount of about 60 g of AT1 powder per kg of polymer melt. The polymer then solidifies to give a solid, which is comminuted to give small pieces, in particular scales. The small pieces are then processed by means of a mill to give a powder. Designation: EPA2.

After the powder has been allowed to stand for 1 to 2 days, it is possible to show that the polymer treated with amine has properties differing from those of the untreated polymer.

Exemplary Hydraulically Setting Compositions

The efficiency of the polymers according to the invention was tested in mortar.

| Composition of mortar mix 1: MM1 (largest particles 8 mm) | Amount |
|---|---|
| Cement (Swiss CEM I 42.5) | 750 g |
| Limestone filler | 141 g |
| Sand 0-1 mm | 738 g |
| Sand 1-4 mm | 1107 g |
| Sand 4-8 mm | 1154 g |

The sands, the filler and the cement and the solid polymer were dry-blended for 1 minute in a Hobart mixer. The mixing water is added within 30 seconds and mixing is continued for a further 2.5 minutes. The total wet mixing time is 2.5 minutes.

TABLE 1

Results of mortar experiment water/cement value (w/c value) 0.43

| | Dose (in % active substance, based on cement) | Slump after 0 min. | Slump after 30 min. | Slump after 60 min. |
|---|---|---|---|---|
| Powder Ex. 1 EPA1 | 0.22 | 158 mm | 156 mm | 150 mm |
| Powder Ex. 2 EPA2 | 0.21 | 178 mm | 175 mm | 170 mm |
| Comparative Example 1: Powder without amine BP1 | 0.2 | 198 mm | 166 mm | 148 mm |

Methods of Measurement
Direct Acid Number

About 1 g of the polymer melt is dissolved in about 30 ml of deionized water and 3 drops of a phenolphthalein solution (1% in ethanol) are added. Titration is effected with 0.1 N NaOH until the colour changes.

Acid number in mmol COOH/g=V/(10×m)

V=consumption of 0.1 N NaOH in ml and m=weight of the polymer melt taken in g

Slump The slump of the mortar was determined according to EN 1015-3.

Results

Table 1 shows the excellent maintenance of processability over 60 minutes of mortars comprising the polymers according to the invention, where as mortar comprising Comparative Polymer 1 without amine has substantially less processability.

Furthermore, these mortar results show that a reaction takes place during the conversion in the third reaction stage (c). The properties of the polymers according to the invention differ substantially from those of the starting polymers with regard to the maintenance of processability of the mortar mix.

The invention claimed is:

1. Process for the preparation of a polymer P having amide and ester groups in a solid state of aggregation, comprising:
   (a) reacting a homo- or copolymer P1 of (meth)acrylic acid, itaconic acid or crotonic acid with at least one monohydroxy compound E at a temperature of up to 200° C. to give a polymer P2 so that anhydride groups form in addition to ester groups,
   (b) cooling the polymer P2 prepared in step (a) to below 60° C. so that the polymer P2 is present in the solid state of aggregation or as a supercooled melt,
   (c) amidating the polymer P2 having anhydride groups and present in the solid state of aggregation or as a supercooled melt with at least one amine compound A at a temperature below 60° C.,
   the amine compound A used in step (c) being present in the solid state of aggregation or on or in a solid carrier material.

2. Process according to claim 1, wherein the polymer P2 is present as powder, flakes, beads, sheets or scales after cooling.

3. Process according to claim 1, wherein the solid carrier material is a mineral binder, a hydraulic additive, silicic acid, a molecular sieve or chalk.

4. Process according to claim 1, wherein the polymer P prepared has less than 1% by weight of water, based on a total weight of the polymer P.

5. Process according to claim 1, wherein the polymer P is substantially anhydrous.

6. Process according to claim 1, wherein, in step (c), the polymer P2 present in the solid state of aggregation or as a supercooled melt is mixed with the at least one amine compound A without use of a solvent.

7. Process according to claim 1, wherein step (a) is effected in the presence of an acid.

8. Process according to claim 1, wherein the monohydroxy compound E is a C6- to C20-alkyl alcohol or has the formula (I)

$$HO-[(EO)_x-(PO)_y-(BuO)_z]-R^1 \qquad (I)$$

in which x, y, z, independently of one another, each has a value of from 0 to 250 and x+y+z is from 3 to 250;
EO denotes ethyleneoxy, PO denotes propyleneoxy and BuO denotes butyleneoxy or isobutyleneoxy, with the EO, PO and BuO building blocks in any possible sequence; and
$R^1$ denotes an alkyl group having 1-20 carbon atoms or alkylaryl group having 7-20 carbon atoms.

9. Process according to claim 8, wherein z is 0 and $R^1$ is a methyl, ethyl, isopropyl or n-butyl group.

10. Process according to claim 8, wherein the monohydroxy compound E is a polyalkylene glycol encapped at one end and having a molecular weight $M_w$ of 300 to 10,000 g/mol.

11. Process according to claim 1, wherein the homo- or copolymer P1 of (meth)acrylic acid, crotonic acid or itaconic acid is prepared by homopolymerization or by copolymerization with at least one further monomer selected from the group consisting of α,β-unsaturated carboxylic acids, α,β-unsaturated carboxylic acid esters, α,β-unsaturated carboxylates, styrene, ethylene, propylene, vinyl acetate and mixtures thereof.

12. Process according to claim 11, wherein the further monomer is selected from the group consisting of methacrylic acid, acrylic acid, crotonic acid, itaconic acid, maleic acid, fumaric acid and salts, esters and mixtures thereof.

13. Process according to claim 1, wherein the copolymer P1 is a copolymer of acrylic acid and methacrylic acid and salts or partial salts thereof; or the homopolymer P1 is a polymethacrylic acid or polyacrylic acid or the salts or partial salts thereof.

14. Process according to claim 1, wherein the homo- or copolymer P1 is a homo- or copolymer which is composed of 10 to 250 monomer building blocks.

15. Process according to claim 1, wherein the amine compound A is an amine of the formula (II)

$$R^2NH-R^3 \qquad (II)$$

in which
$R^2$ and $R^3$ together form a ring which optionally contains oxygen, sulphur or further nitrogen atoms;
or in which $R^2$ and $R^3$, independently of one another, represent an alkyl group having 1 to 12 carbon atoms, a cycloalkyl group having 5 to 9 carbon atoms, an aralkyl group having 7 to 12 carbon atoms, a hydroxyalkyl groups, or a compound of the formula (III), (IV) or (V) or H:

$$-(R^4-X)_nR^5 \qquad (III)$$

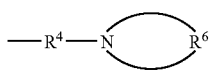 (IV)

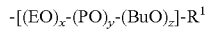 (V)

wherein:
R⁴, independently of one another, represents an alkylene group;
R⁵ a $C_1$- to $C_4$-alkyl group, a hydroxyalkyl group or H;
X, independently of one another, represents an S, O or $NR^7$;
n has a value between 1 and 100; $R^7$, independently of one another, represents a $C_1$- to $C_4$-alkyl group, a hydroxyalkyl group or H;
$R^6$ is an alkylene group optionally having heteroatoms;
x, y, z, independently of one another, each has a value of from 0 to 250 and x+y+z is from 3 to 250;
EO denotes ethyleneoxy, PO denotes propyleneoxy and BuO denotes butyleneoxy or isobutylenoxy, with the EO, PO and BuO building blocks in any possible sequence; and
$R^1$ denotes an alkyl group having 1-20 carbon atoms or alkylaryl group having 7-20 carbon atoms.

16. Process according to claim 15, wherein compound A is selected from the group consisting of ammonia, morpholine, 2-morpholin-4-ylethylamine, 2-morpholin-4-ylpropylamine, N,N-dimethylaminopropylamine, ethanolamine, diethanolamine, 2-(2-aminoethoxy)ethanol, dicyclohexylamine, benzylamine, 2-phenylethylamine, polyoxypropylenediamine, N-(2-hydroxyethyl)ethylenediamine and mixtures thereof.

17. Process according to claim 1, wherein, in step (a), a monoamine compound A' is used in addition to the monohydroxy compound E.

18. Process according to claim 17, wherein the monoamine compound A' is an amine of the formula (II')

$$R^{2'}NH-R^{3'} \quad (II')$$

in which
$R^{2'}$ and $R^{3'}$ together form a ring which optionally contains oxygen, sulphur or further nitrogen atoms;
or in which $R^{2'}$ and $R^{3'}$, independently of one another, represent an alkyl group having 8 to 20 carbon atoms, a cycloalkyl group having 5 to 9 carbon atoms, an aralkyl group having 7 to 12 carbon atoms, a compound of the formula (III'), (IV') or (V') or H

 (III')

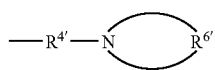 (IV')

 (V')

in which $R^{4'}$ represents an alkylene group and $R^{5'}$ represents a $C_1$- to $C_4$-alkyl group and X represents an S, O or N and v is 1 for X=S or O or v is 2 for X=N; and $R^{6'}$ is an alkylene group optionally having heteroatoms,
x, y, z, independently of one another, each has a value of from 0 to 250 and x+y+z is from 3 to 250;
EO denotes ethyleneoxy, PO denotes propyleneoxy and BuO denotes butyleneoxy or isobutyleneoxy, with the EO, PO and BuO building blocks in any possible sequence;
and $R^1$ denotes an alkyl group having 1-20 carbon atoms or alkylaryl group having 7-20 carbon atoms.

19. Process according to claim 18, wherein the compound A' of the formula (II') has the substituents $R^{2'}$ of the formula (V') and $R^{3'}$ as H.

20. Process according to claim 1, wherein the temperature of the first step (a) is between 140° C. and 200° C. and the temperature of the second step (b) is between 10° C. and 60° C.

21. Process according to claim 1, wherein the polymer P having amide and ester groups has the formula (VI)

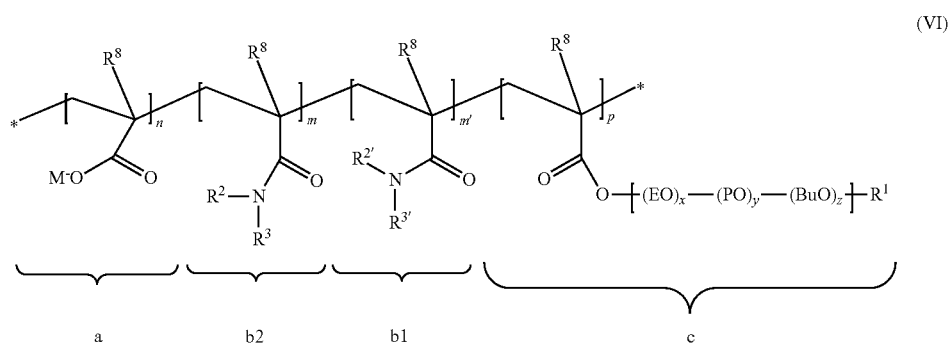 (VI)

in which M denotes a cation or an organic ammonium;
$R^8$, independently of one another, denotes an H or methyl, and
$R^2$ and $R^3$ together form a ring which optionally contains oxygen, sulphur or further nitrogen atoms,
or
$R^2$ and $R^3$, independently of one another, represent an alkyl group having 1 to 12 carbon atoms, a cycloalkyl group having 5 to 9 carbon atoms, an aralkyl group having 7 to 12 carbon atoms, a hydroxyalkyl group, a compound of the formula (III), (IV) or (V) or H

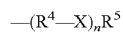 (III)

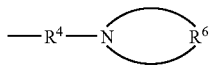 (IV)

 (V)

in which $R^4$, independently of one another, represent represents an alkylene group and $R^5$ represents a $C_1$- to $C_4$-alkyl group, a hydroxyalkyl group or H and X, independently of one another, represents an S, O or $NR^7$, in which n has a value between 1 and 100 and in which $R^7$, independently of one another, represents a $C_1$- to $C_4$-alkyl group, a hydroxyalkyl group or H, in which $R^6$ is an alkylene group optionally having heteroatoms;

and $R^{2'}$ and $R^{3'}$ together form a ring which optionally contains oxygen, sulphur or further nitrogen atoms, or $R^{2'}$ and $R^{3'}$, independently of one another, represent an alkyl group having 8 to 20 carbon atoms, a cycloalkyl group having 5 to 9 carbon atoms, an aralkyl group having 7 to 12 carbon atoms, a compound of the formula (III'), (IV') or (V') or H

 (III')

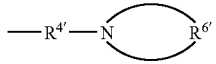 (IV')

 (V')

in which $R^{4'}$ represents an alkylene group and $R^{5'}$ represents a $C_1$- to $C_4$-alkyl group and X' represents an S, O or N, and v is 1 for X'=S or O or v is 2 for X'=N; and $R^{6'}$ is an alkylene group optionally having heteroatoms, and n+m+m'+p denotes a value from 10 to 250, and n>0, m>0, p>0 and m'≧0, and in which x, y, z, independently of one another, each has a value of from 0 to 250 and x+y+z is from 3 to 250;

EO denotes ethyleneoxy, PO denotes propyleneoxy, BuO denotes butyleneoxy or isobutyleneoxy, with the EO, PO and BuO building blocks in any possible sequence; and $R^1$ denotes an alkyl group having 1 to 20 carbon atoms or alkylaryl group having 7 to 20 carbon atoms.

22. Process according to claim 21, wherein the amount of a is 10 to 90 mol %, that of b1 is 0 to 6 mol %, that of b2 is 0.1 to 40 mol %, that of c is 9.9 to 89.9 mol %, based in each case on the total molar amount of building blocks of a, b1, b2 and c in the polymer P, the molar amount of b2 being less than the molar amount of a.

23. Process according to claim 1, wherein the amine compound A is in the solid state of aggregation at the processing temperature of below 60° C.

24. Process according to claim 1, wherein amine compound A is in the liquid state of aggregation at the processing temperature of below 60° C. and is applied to a solid carrier material or enclosed in a solid carrier material.

25. Process according to claim 1, wherein the solid carrier material is selected from the group consisting of a mineral binder, a hydraulic additive, silicic acid, a molecular sieve, chalk, stone dust, calcium hydroxide, gypsum, silica, diatomaceous earth, silica fume, rice ash, alumina, aluminum hydroxide, vermiculite, loam, clay, and bentonite.

26. Process according to claim 1, wherein the solid carrier material is present in powder form or as fibres.

27. Process according to claim 1, wherein the solid carrier material is silicic acid.

* * * * *